United States Patent [19]

Norcross et al.

[11] Patent Number: 5,885,448
[45] Date of Patent: Mar. 23, 1999

[54] THERMOPHILIC AEROBIC WASTE TREATMENT PROCESS

[75] Inventors: Kenneth L. Norcross; Yanlong Li, both of Edwardsville, Kans.

[73] Assignee: IP Holding Company, Lowell, Mass.

[21] Appl. No.: 876,559

[22] Filed: Jun. 16, 1997

Related U.S. Application Data

[60] Continuation of Ser. No. 560,160, Nov. 20, 1995, Pat. No. 5,656,155, which is a division of Ser. No. 233,276, Apr. 26, 1994, Pat. No. 5,587,081.

[51] Int. Cl.$^6$ .................................................. C02F 3/12
[52] U.S. Cl. ........................ 210/149; 210/194; 210/201; 210/218; 210/220
[58] Field of Search .................................. 210/149, 179, 210/180, 194, 200, 201, 205, 218, 220, 612, 621, 622

[56] References Cited

U.S. PATENT DOCUMENTS

| | | | |
|---|---|---|---|
| 4,009,099 | 2/1977 | Jeris | 210/612 |
| 4,163,712 | 8/1979 | Smith | 210/622 |
| 4,207,180 | 6/1980 | Chang | 210/612 |
| 4,711,721 | 12/1987 | Jamonet et al. | 210/621 |
| 4,975,194 | 12/1990 | Fuchs et al. | 210/612 |

OTHER PUBLICATIONS

Kenneth L. Norcross, A Full Scale Comparative Evaluation of Aerator Thermal Transfer Characteristics, Oct. 1985; pp. 1–24.

Harlan G. Kelly, Henryk Melcer, Donald S. Mavinc, Authothermal thermophilic aerobic digestion of municipal sludges; A one-year, full-scale demonstration project, Nov./Dec., Water Environment Research, vol. 65, No. 7, p. 859.

Harlan G. Kelly, M.ASCE*, Authothermal Thermophilic Aerobic Digestion; A Two-Year Appraisal of Canadian Facilities, Environmental Engineering Proceedings, 1991, p. 296.

*Primary Examiner*—Thomas G. Wyse
*Attorney, Agent, or Firm*—Wolf, Greenfield & Sacks, P.C.

[57] ABSTRACT

A system for thermophilic aerobic destruction of pathogenic organisms and organic matter within waste water treatment sludge includes a tank for maintaining the sludge and an air transfer apparatus for injecting air into the sludge near the bottom thereof so as to bubble up through the sludge and react exothermically with the thermophilic microorganisms therein so as to kill or destroy the mesophilic microorganisms within the sludge. The thermophilic reaction is preferably controlled within a desired temperature range by control of the flow of fresh air versus recycled air being injected into the sludge. The fresh air to recycle air ratio can be controlled by several different mechanisms so as to produce the desired temperature range. The air is also utilized to mix the sludge within the tank. A pumping apparatus is also provided for transferring sludge into and out of the tank and for recirculating the sludge for purposes of auxiliary mixing. The pump can also be utilized in conjunction with an eductor for drawing fresh air into the sludge. A process controller is advantageously useable in conjunction with the various equipment to control the overall system.

6 Claims, 4 Drawing Sheets

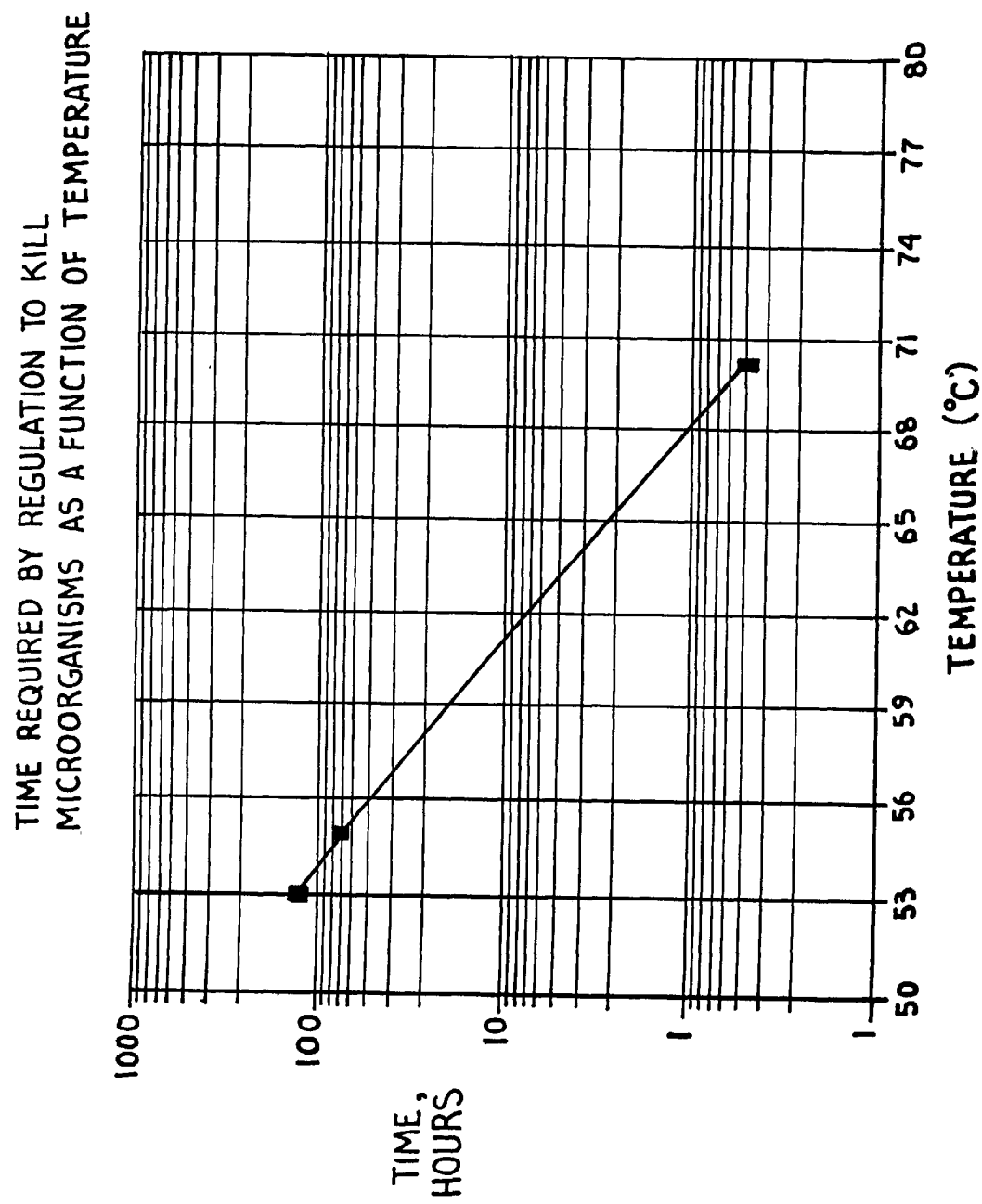

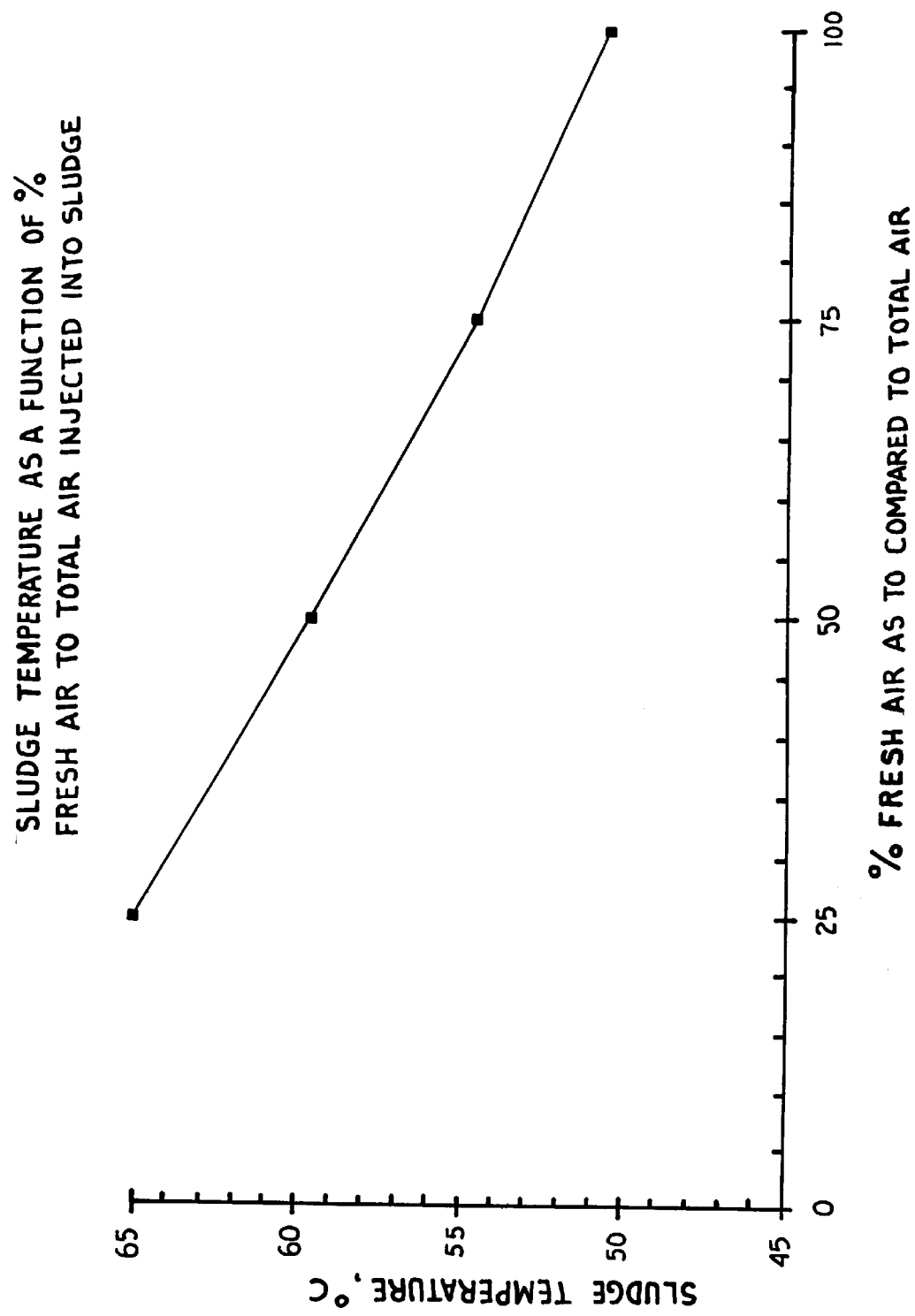

THERMOPHILIC AEROBIC WASTE TREATMENT PROCESS

This application is a continuation of application Ser. No. 08/560,160, filed Nov. 20, 1995, now U.S. Pat. No. 5,656, 155, which is a divisional of U.S. application Ser. No. 08/233,276, filed Apr. 26, 1994, now U.S. Pat. No. 5,587, 081.

BACKGROUND OF THE INVENTION

The present invention is directed to an improved method of destroying pathogenic organisms, excess biosolids, and/ or organic contaminants through the utilization of thermophilic temperatures within sludge and similar materials that include microorganisms such as result from waste water treatment processes. In particular, the systems and methods of the present invention utilize controlled recirculation or air within the sludge to maintain the temperature of the sludge in a pre-selected efficient temperature range for destroying the pathogens.

Over many years numerous processes have been developed for the treatment of waste water which utilize microorganisms for the destruction of various contaminants, especially organic contaminants, carried by the waste water. The microorganisms that feed on and, therefore, destroy the contaminants in the waste water form a biomass and after time this biomass becomes too large for the system, such that part must be removed. Consequently, the biomass along with accompanying amounts of silt and the like must be regularly removed from the process. This biomass is generally referred to as sludge and typically includes a wide range of microorganisms. Some of these microorganisms may be harmful to humans and include pathogenic bacteria, enterovirus and certain protozoan organisms. By definition pathogenic organisms are organisms that may be harmful to humans and, therefore, it is important to control the final disposition of the material (sludge) containing these organisms. In general governmental regulations impose various restrictions upon the distribution of sludge having pathogenic organisms. Although regulations of this type vary on a frequent basis, it is generally the rule that the sludge cannot be simply disposed of by distribution on the surface of the ground or in some other manner that could possibly expose humans or water supplies for humans to the pathogens in the sludge.

Sludge also contains other materials including microorganisms which are not pathogenic in nature. Typically the sludge includes a group of microorganisms that thrive in what is generally referred to as the thermophilic temperature range. These thermophilic microorganisms are normally not harmful to humans and there are both aerobic and anaerobic bacteria that thrive within the thermophilic range. This invention is especially interested in the aerobic microorganisms.

Although the temperature ranges for high activity for classification of bacteria varies somewhat depending upon the author describing the range, thermophilic activity usually takes place within the range of from 50° to 70° centigrade. The pathogenic bacteria usually live within what is referred to as a mesophilic range which is around 37° centigrade or the normal body temperature of humans.

An interesting phenomena which has been previously noted by others and used in various sludge processes is that if the temperature of the sludge is raised to the thermophilic range, then over time the mesophilic microorganisms will be destroyed. A further advantage of the thermophilic microorganisms is that their use of oxygen in an aerobic process is exothermic in nature, and consequently, produces heat. Further, although the pathogens can be destroyed by external application of heat to the sludge, this is a very energy intensive process and is normally not justified from a cost point of view. To avoid the expense of heating, various prior art concepts have attempted to use the exothermic nature of the thermophilic bacteria to destroy the pathogenic microorganisms within the sludge.

The major problem with prior art processes which have attempted to utilize the heat produced by the thermophilic microorganisms to destroy the mesophilic microorganisms, is that air must be injected into the sludge in order to provide oxygen to react with the thermophilic bacteria. Depending upon the type of sludge and the depth of the sludge, only approximately 2% of the air (about 10% of the oxygen) may react with the sludge as it passes up through the sludge and is exhausted from the process.

The air utilized for such processes is normally compressed air which has been obtained from the ambient air surrounding the processing plant. This air is normally not 100% humidified and may have a temperature which is relatively low compared to the desired thermophilic temperature of the sludge. Consequently, as the air rises through the sludge it will be humidified and heated thus substantially reducing the temperature of the sludge.

Since the thermophilic microorganism reaction rate is very sensitive to the temperature (directly proportional), and because the destruction of the mesophilic microorganisms is directly proportional to the temperature, it is desirable to maintain the temperature near the upper end of the thermophilic range in order to substantially reduce reaction time. As an example, reaction time to destroy pathogens at 54° centigrade may be approximately 100 hours whereas reaction time at 65° centigrade for an equivalent destruction may be approximately 3 hours. Therefore, the flow of fresh air through the sludge has a substantial detrimental effect upon the rate of reaction and the amount of time required to destroy pathogens within a given amount of sludge, since the air significantly reduces the temperature of the sludge.

Furthermore, thermophilic sludge reactions require at least a minimal amount of residence time for the oxygen in the air to react with the microorganisms within the sludge. Since the rate of rise of air bubbles through the sludge is not substantially controllable by any simple mechanism, most efficient processes of this type utilize fairly tall tanks such that the air rises through a relatively high liquid layer and, therefore, has a longer residency in conjunction with the liquid to allow for exchange of oxygen with the bacteria and for reaction to occur. That is, air residence time in a tank that is 50 feet tall would be approximately ten times as long within the liquid as compared to a tank that had a liquid layer that was only five feet tall. Unfortunately, in many localities, the maximum height of a processing vessel is limited due to ground conditions or zoning restrictions and only relatively short tanks can be utilized. The net result is that the air cannot be utilized efficiently by the bacteria in the liquid, but becomes fully saturated and heated by the liquid thereby substantially lowering the temperature of the liquid to the lower end of the thermophilic range or even outside of the thermophilic range.

Processes of this type have, therefore, had only very limited success and in some locations the goal of pathogen destruction has not been met even after extended periods of reaction time.

Even where reaction time is slow, a processing plant may not be able to wait for a substantial passage of time for destruction of the pathogenic organisms by thermophilic reaction, since the waste water treatment plant is typically producing a fairly large amount of sludge which must be removed from that process on a daily basis and, therefore, treated relatively quickly. Otherwise, there would be a requirement for perhaps ten to thirty tanks in order to receive each day's allotment of sludge and provide sufficient time for the treatment of the sludge in the low thermophilic temperature range before it can be pumped and the tank refilled with new sludge.

A further problem that has existed in the prior art associated with thermophilic destruction of pathogens in this manner has been that such processes often include complicated and energy intensive equipment to operate. Some have incorporated extensive mixing equipment within the sludge reaction vessels and/or other equipment which has substantially added to the operating and capital cost of such processes. Furthermore, the prior art has only one acceptable operating level, whereas it is desirable to have equipment that can process different volumes of sludge at variable batch levels and consequent different batch process retention times. This variability is especially important for proper operation, when flow of material to the process varies. Consequently, it is desirable to provide a process of this type utilizing inexpensive and relatively energy efficient processing equipment where possible, especially where all moving parts are outside the reaction vessel. Further processes that have used simple air diffusion without mixing have normally proved to be very inefficient.

With respect to processes for the destruction of waste water contaminants and other organic contaminants, it has been found that operation of a treatment process in the thermophilic range greatly reduces the amount of excess biomass (sludge) production. This in turn reduces the amount of sludge wasted to disposal and the cost of such disposal. Therefore, while the methods and apparatus described herein are especially suitable for treating excess sludge, such methods and apparatus can be utilized for waste water treatment and similar processes reducing organic material within a fluid.

SUMMARY OF THE INVENTION

The present invention is directed to a process for relatively rapid destruction of pathogenic organisms in waste water treatment sludges and similar compositions and/or the reduction of organic contaminants in a liquid, by use of temperatures that are in the thermophilic range, especially the upper thermophilic range. In general, the heat utilized to raise the temperature of the sludge to thermophilic temperature ranges is produced by interaction of oxygen with aerobic thermophilic microorganisms, especially bacteria, within the sludge. In this manner the heating of the sludge is self generating except for the energy required to run the devices injecting air into the sludge.

Typically, in accordance with the present invention the thermophilic range will be considered to be between 50° and 70° centigrade, although ranges on both sides of this are possible at times depending upon the sludge and the processing conditions. As will be noted below, temperatures below this range produce relatively very long reaction times. Temperatures above the above noted range may become high enough to kill the thermophilic microorganisms and, therefore, be self defeating.

In accordance with the present invention a preferred temperature is approximately 65° centigrade. The 65° centigrade temperature is chosen for several reasons, but perhaps the most important reason being that the reaction time for destruction of mesophilic microorganisms at 65° centigrade for purposes of meeting governmental regulations is approximately three hours which is an easily obtained processing time for most sludge treatment facilities, since sludge is often pumped once every twenty four hours from the waste water treatment plant. Where two tanks are utilized for sludge treatment in accordance with the invention, the time limits associated with the sludge treatment become even less of a concern, since each tank must be turned over only once every forty eight hours.

Of substantial importance in the present invention is the method in which the thermophilic reaction temperature is controlled. In particular, the process calls for the placement of sludge (waste water or the like) into an enclosed reactor. Air (or purified oxygen may equivalently be used) is then injected into the sludge. The air can be injected into the sludge by means of a variety of processes including mixing with sludge that is being recirculated from the reactor and back to the reactor by a pump, by sparging into lower portion of the reactor, by drawing air into the sludge through an eductor and by numerous other suitable means for injecting air into the sludge. However, unlike in prior art treatment processes of this type, the air is not simply allowed to flow through the sludge and then exit the reactor in a manner such that it is not reutilized. In accordance with the present invention air is recirculated from the top of the reactor to near the bottom of the reactor for reinjection into the sludge located there. The amount of recirculated air is controlled in such a manner as to thereby control the temperature of the sludge within the reactor.

That is, when the sludge temperature drops below a preselected temperature, more of the air that has already passed through the reactor and has consequently become heated and fully humidified (saturated) is recirculated back through the reactor compared to usage of fresh air. When the temperature of the sludge exceeds the preselected temperature, then less of the air is recycled and more fresh make up air from the ambient surroundings is added to the air stream that is injected beneath the sludge. As only a portion of the oxygen in the air is used during each pass through the reactor (for example, in some cases about 10%), although this percentage can vary substantially with the height of the sludge and with reaction conditions, the air may be circulated a number of times without substantially further lowering of the temperature of the sludge due to evaporation of moisture into the air to humidify it, because it is already heated, or exchange of heat with the air in order to increase its temperature, because it is already heated. In this manner the temperature of the sludge in the reactor can be relatively closely controlled so as to efficiently kill essentially all of the pathogenic organisms within the sludge within a preselected period of time.

Preferably, the treatment system also provides for mixing of the sludge within the reactor. In one embodiment of the invention a tube is utilized within the reactor so as to separate a radially inward portion of the sludge from a radially outward portion of the sludge with interconnection of the inner and outer portions at the top and bottom of the tube. The air is injected at the bottom of either the inner or outer portion and in this manner functions as an air-lift pump. The portion of the sludge above the injection of the air rises with the air as it passes through the sludge. At the same time as the sludge in the air portion of the reactor rises, the sludge on the opposite side of the tube flows downwardly thereby creating a circulation or mixing of the sludge.

The sludge can also be auxiliary mixed by a pump that withdraws a portion of the sludge from the reactor and injects it back into the reactor or by other suitable means for circulating and mixing the sludge. Preferably, to reduce the cost of operating and maintaining the equipment and to simplify repairs and inspections, there is no equipment within the reactor itself for the purpose of circulating the sludge or injecting the air into the sludge that has moving parts.

OBJECTS AND ADVANTAGES OF THE INVENTION

Therefore, the objects of the present invention are: to provide a process for the treatment of waste water sludge and similar materials to destroy the pathogenic organisms and organic contaminants within the sludge by means of exposing the sludge to temperatures within the thermophilic range; to provide such a process wherein the temperature range within the sludge is controlled by the injection of oxygen, especially oxygen contained in air, into the sludge; to provide such a process wherein at least some portion of the air after passing through the sludge is recirculated back to the bottom of the sludge; to provide such a process wherein the amount of recirculation of air within the process is controlled in such a manner as to achieve a substantially constant temperature or range of temperatures in the upper thermophilic region within the sludge; to provide such a process including control mechanisms for determining the temperature of the sludge within the reactor and automatically controlling the amount of recirculation of air that has passed through the sludge back to the reactor versus the influx of fresh air taken from ambient surroundings; to provide such a process wherein circulation and mixing of sludge within the reactor is accomplished by use of a dividing tube within the reactor to allow a portion of the sludge to be air lifted by the air injected into the sludge and a remaining portion to flow downward on an opposite side of the tube; to provide such a process utilizing a pump to provide auxiliary mixing of the sludge; to provide such a process wherein substantially all moving operating equipment for circulating and mixing sludge and for injecting air into the sludge is located exterior of the reactor; to provide equipment for use in the above described process; and to provide a process which is relatively easy to operate, that destroys organic matter and pathogenic microorganisms within the sludge within a relatively short period of time, that is economical to operate and that is especially well suited for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is chart illustrating the relationship between time and temperature relative to the regulatory time required for killing pathogenic microorganisms at a particular temperature.

FIG. 4 is a graph illustrating the relationship between temperature in a reactor versus the percentage of fresh air added to a recirculating air stream for a specific process for treating sludge to remove pathogenic organisms.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
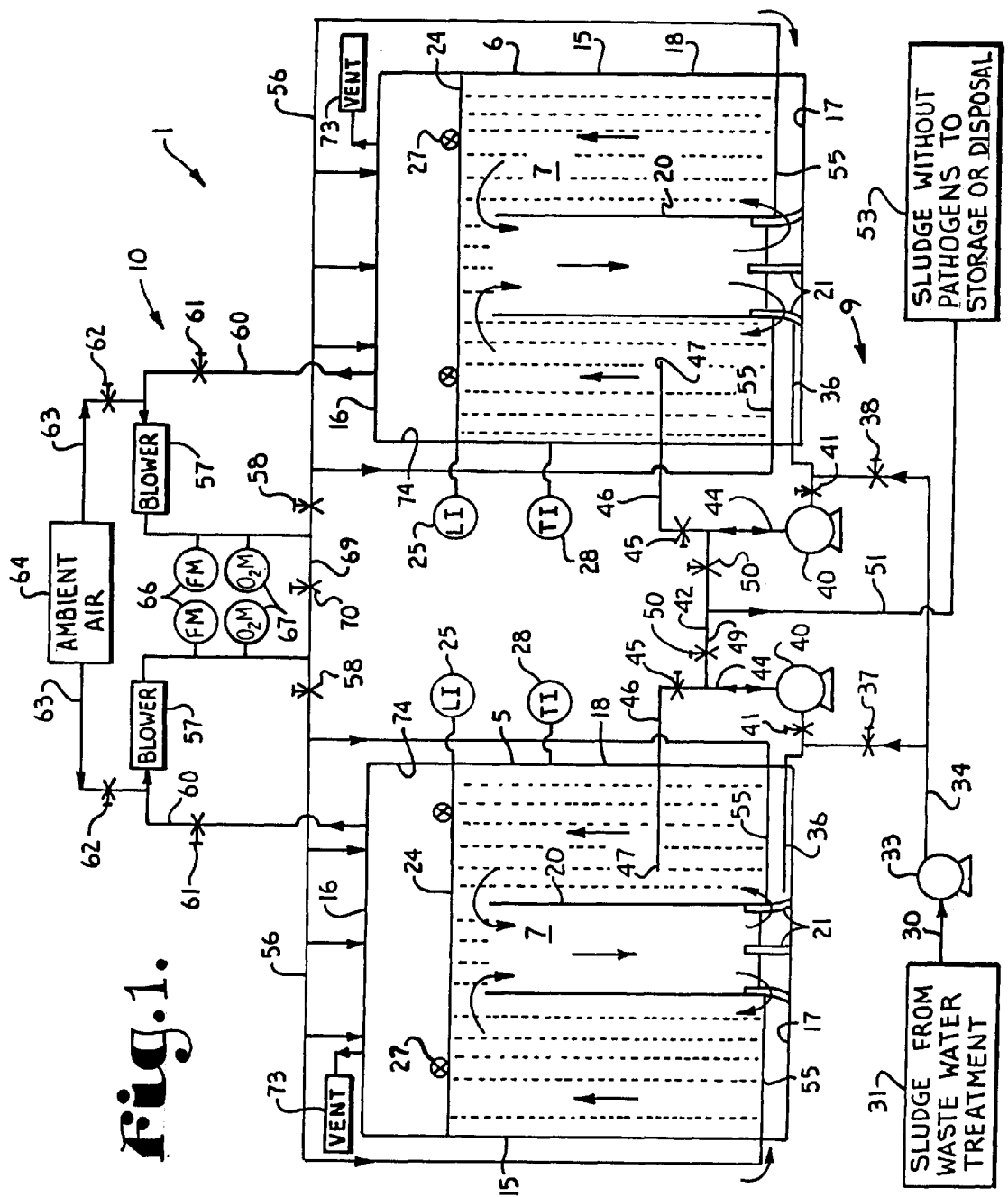
FIG. 1 is a schematic drawing of a system in accordance with the present invention for destroying pathogenic microorganisms within sludge illustrating a pair of reactors having a sludge level therein and having air injected into the sludge so as to bubble upwardly therethrough.

Illustrated in FIG. 1 is a process or system for the thermophilic and aerobic destruction or digestion of pathogenic microorganisms of a type generally referred to as thermophilic aerobic process (TAP) and generally designated by the reference numeral 1. Processes of this type may also be known as autothermal thermophilic aerobic processes (ATAP). The system 1 includes a pair of reactors 5 and 6 containing sludge 7, a pump and piping apparatus 9, and a blower and air conduit apparatus 10.

Each reactor 5 and 6 includes a cylindrical tank 15 having top 16, a bottom 17 and a circumferential side wall 18. The size and shape of the tank 15 can be adjusted for the particular conditions associated with sludge and with the environmental conditions of the surrounding area including height restrictions.

Located in the center of each tank 15 and being axlely aligned therewith is a draft tube 20. Each of the tubes 20 is mounted above the tank bottom 17 by support feet 21 which allow flow beneath the tube 20.

The sludge 7 is generally pumped into a partially empty tank 15 until it reaches a pre-selected level 24 which is monitored by a level indicator 25. The full level 24 of the sludge 7 is located substantially above the top of the tube 20 so as to allow flow of sludge 7 over the top of the tube 20 while the feet 21 allow flow of sludge 7 beneath the tube 20 so as to allow flow between portions of the sludge 7 located on opposite sides of the tube 20.

A pair of foam cutters 27 are located at the sludge upper level 24 and include spinning blades designed to break up foam formation within the reactors 5 and 6. Each of the tanks 15 include a temperature indicator 28 for indicating the temperature of the sludge 7 within the tank 15.

The pump and piping apparatus 9 controls the flow of sludge 7 within the tanks 15 as well as the flow of sludge to and from the tanks 15. The apparatus 9 has a conduit 31 which receives sludge from a waste water treatment facility generally indicated by the reference numeral 31. This sludge may come from a holding tank or directly from the waste water treatment process.

The sludge in the conduit 30 is delivered to a pump 33 which conveys it through a conduit manifold 34 which is flow connected to distribution tubes 36 in the bottom of each of the tanks 15. The distribution tubes 36 are perforated therealong so as to allow flow of sludge into the tanks 15. Flow of sludge from the pump 33 to the tubes 36 is controlled by a pair of valves 37 and 38. Each of the tubes 36 also flow connect to a bydirectional pump 40 having flow controlled by a valve 41. Each pump 40 is also connected to a conduit manifold 42 having a flow pipe 44 having flow controlled by a valve 45 which in turn connects to a flow pipe 46 having an opening at 47 to the interior of each associated tank 15. Each flow pipe 44 also connects to a common pipe 49 under flow control of a valve 50 which in turn connects to a discharge pipe 51 flow connecting with a sludge disposal apparatus generally represented by the reference numeral 53.

In this manner the pump 30 transfers sludge 7 from the waste water treatment facility 31 through tubes 38 under control of either valve 37 or 38 depending upon whether it is desired for flow to go to reactor 5 or 6. The sludge 7 is pumped into a reactor tank 15 until the high level mark 24 is reached at which time sludge 7 is no longer delivered to the tank 15. During operation of the system 1 the pump 40 allows withdrawal of sludge 7 from the tank 15 through a pipe 46 and recirculation of the sludge 7 back through tube 36. Alternatively the pump 40 can be reversed and flow can be in the opposite direction. When sludge 7 has been completely treated within the tank 15, the pump 40 with valves 41 and 50 open and valve 45 closed can be utilized to pump sludge 7 without pathogens therein to storage 53.

The blower and air conduit apparatus 10 includes a series of air sparging tubes or spargers 55 connected by a piping manifold 56 to the discharge of a blower 57 under flow control of a valve 58. Each of the blowers 57 is connected by a pipe 60 through which flow is controlled by a valve 61 to the interior of the tank top 16. It is foreseen that each blower 57 may include speed control or may represent multiple blowers. The pipe 60 is also flow connected through a valve 62 to a pipe 63 which is in flow communication with ambient air generally identified by the reference numeral 64. While air is identified as a source of oxygen for this embodiment, the oxygen may come from any suitable oxygen containing gas including purified oxygen. Also located along the manifold 56 at the discharge of each blower 57 is an air flow meter 66 and an oxygen percentage meter 67. The manifolds 56 for each of the tanks 15 are interconnected by a pipe 69 through which flow is controlled by a valve 70.

The interior of each tank 15 is also connected to a vent 73 flow connected with the interior of the tank 15 at the top 16. The vent 73 allows the venting of gas from within each associated tank 15 to the atmosphere, if the pressure within the tank exceeds a pre-selected pressure. Normally the majority of the gas from the interior of the tank 15 will be through the blower 57 with a smaller portion passing through the vent 73. Theoretically the amount of gas passing through each vent 73 will be approximately equal to the amount of ambient air brought in through the ambient air source 64 less the amount of oxygen used in the sludge 7.

The vent 73 may incorporate odor elimination devices such as are commonly used in the industry to treat air with odoriferous components picked up during passage through the sludge 7. Odor control systems are well known to the industry and, consequently, such systems will not be discussed in detail herein.

The blower and air conduit apparatus 10 is utilized by operating the blower 57 associated with each tank 15 in such a manner that air is blown through the associated manifold 56 and out sparger tubes 55 so as to be bubbled into the sludge 7 near the lower part thereof. As seen in the drawings, bubbles are shown rising through the sludge 7. Once the air that enters the tank 15 through the tubes 55 reaches the upper level of the sludge 24 the air enters a cavity 74 defined by the region of the tank 15 above the sludge upper level 24. The air is accumulated in the cavity 74 and is at least partially drawn by the blower 57 through the conduit 60 under control of the valve 61.

Ambient or fresh air flow is also drawn through the conduit 63 under control of valve 62 into the blower 57. In this manner the fresh air is mixed with a recycle air or gas stream from the top of the tank 15 and delivered to the blower 57 which in turn discharges it through the manifold 56 to the sparger tubes 55 of the tank 15. Flow meter 66 and oxygen percentage meter 67 are utilized to optimize the flow and percent of oxygen within the air passing through the sparger tubes 55 so as to control the temperature in the sludge 7 of a respective reactor 5 or 6.

The temperature indicator 28, along with equipment to measure the percentage of oxygen in gas injected into the tank 15 which will be discussed below, are utilized to ensure that the correct mix of recycle air or gas and fresh air is utilized. That is, as the sludge 7 temperature indicated by the temperature indicator 28 exceeds a pre-selected temperature, such as a preferred temperature of 65° centigrade, then additional fresh air is drawn through the conduit 63 by opening the valves 62 wider and partially closing the valve 61. If the temperature in the tank 15 drops below the pre-selected temperature, then the valve 61 is opened further and the valve 62 is closed so as to recycle more air and thereby increase the temperature of the sludge 7. There may be occasions when it is desirable for the blower 57 associated with one tank to operate in conjunction with the opposite tank in which case the valve 58 of the blower being used can be closed and the valve 70 opened so as to cross over the pipe 69 to the opposite.

Figure 2:
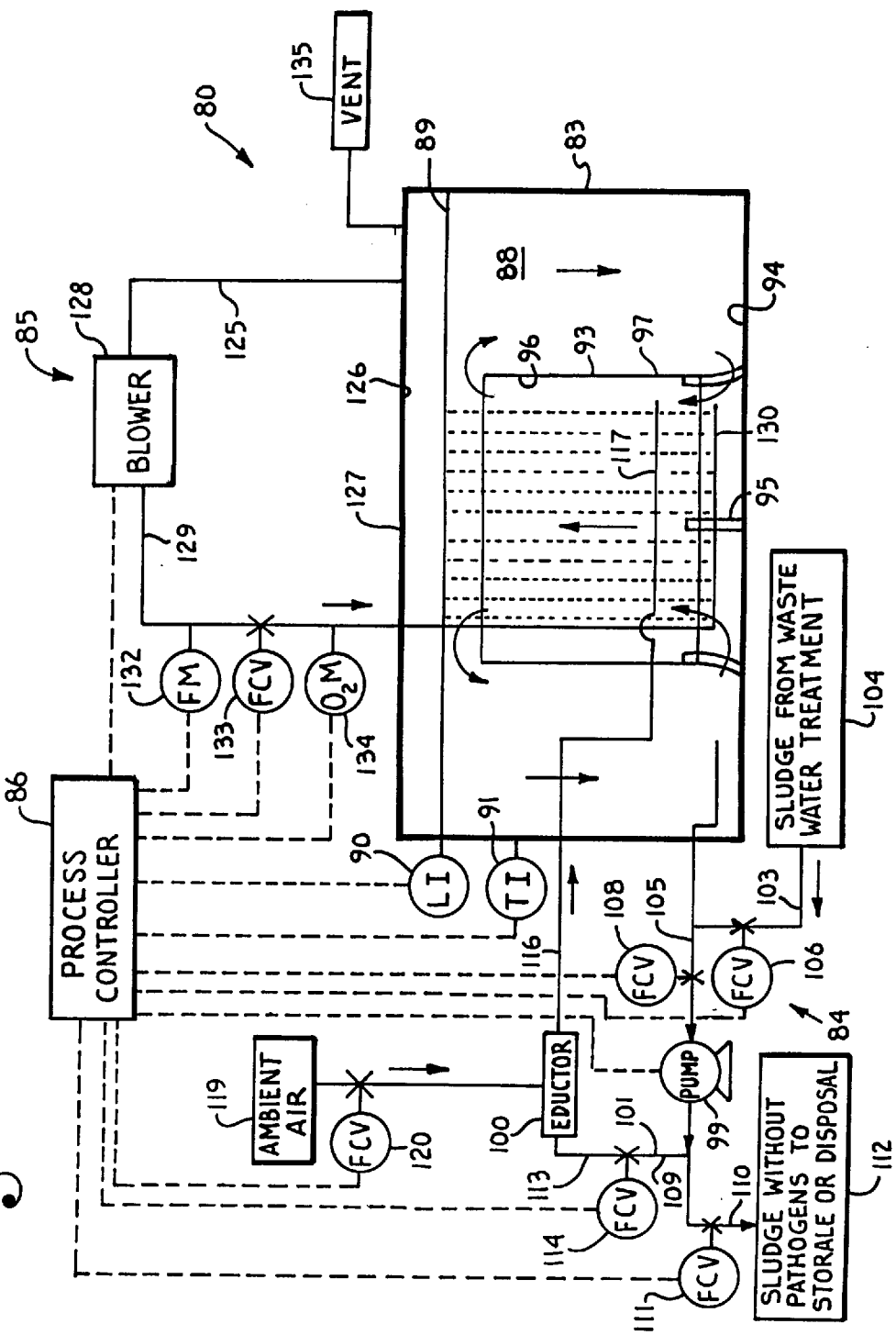
FIG. 2 is schematic view of a modified system in accordance with the present invention.

Illustrated in FIG. 2 is a second embodiment of the present invention which is directed to a thermophilic aerobic process or system generally designated by the reference numeral 80. The system 80 is similar in many aspects to the system 1 of the previous embodiment, but has certain differences which will be more fully described at this time, while the features which are common will be described only in such detail as is necessary to reflect similar features in the previous embodiment.

The system 80 includes a tank 83, a fluid pumping apparatus 84, an air transfer apparatus 85 and a process controller apparatus 86.

The tank 83 is similar in certain aspects to the tank of the previous embodiment with a major exception being that the tank 83 is relatively much shorter with a substantially greater ratio of diameter to height. Sludge 88 is received in the tank 83 so as to normally fill the tank 83 to a preselected fill level 89. The fill level 89 of sludge 88 within the tank 83 is indicated by a level indicator 90 and the temperature of the sludge 88 in the tank 83 is indicated by a temperature indicator 91.

Located within the tank 83 is a tube 93 supported in spaced relation to a bottom 94 of the tank by supports 95. The tube 93 is positioned within the tank so as to have a vertically extending center axis so as to be spaced from both the tank bottom 94, the sludge upper level 89 and the sidewalls of the tank 83 so as to allow flow of sludge 88 within the tank 83 between a tube interior 96 and a tube exterior 97. The sludge 88 located in the tube interior 96 forms a first part of the sludge whereas the sludge located to the exterior 97 of the tube 93 forms a second part of the sludge which are interconnected at both the top and the bottom of the tube 93.

The fluid pumping apparatus 86 includes a pump 99, an eductor 100 and a piping manifold 101 connected to the pump 99 and eductor 100. The piping manifold 101 includes a first conduit 103 connected to a source of sludge generally represented by the reference numeral 104 and which normally will be an active waste water treatment facility wherein the sludge is either pumped directly from the treatment equipment or from a sludge storage tank. The conduit 103 interconnects with a conduit 105 with fluid flow through the conduit 103 controlled by flow control valve 106. The pipe 105 extends into the tank 83 near the bottom 94 thereof. The pipe 105 opens into the interior of the tank 83 and is in flow communication with the sludge therein such that sludge passing through the pipe 105 can flow from the conduit 103 into the tank 83.

The pump 99 is also connected to the conduit 105 and flow of fluid from the conduit 105 into the pump is controlled by a flow control valve 108. The pump 99 is connected on an opposite side thereof to a pipe 109 which bifurcates and has section 110 through which flow is controlled by flow control valve 111 and which flow connects with a sludge disposal apparatus 112. The conduit 109 also has a section 113 through which flow is controlled by control valve 114 which joins with the eductor 100. The eductor 100 is in turn flow connected with the interior of the tank by means of a conduit 116 having a section 117 which is located within the sludge 88 surrounded by the tube 83. The section 117 is perforated to allow air and fluid to pass therefrom. The eductor 100 is also connected to a source of ambient fresh air generally represented by the reference numeral 119 such that sludge fluid passing through the eductor 100 and being conveyed therethrough by pipes 113 and 116 may entrain air that is drawn into the fluid from the air source 119 through the eductor 100. The air flow from the air source 119 is controlled by flow control valve 120.

The air transfer apparatus 85 includes a conduit 125 flow connected with a chamber 126 formed within the top of the tank 83 between the sludge upper level 89 and a roof 127 of the tank 83. The conduit 125 also flow connects with a blower 128 which can be any apparatus suitable for transferring gas and developing a pressure head within the air passing therethrough. The air passing through the blower 128 is recycle air in accordance with the invention. The conduit 129 is flow connected with a sparger 130 which is horizontally positioned beneath the sludge 88 contained within the tube 93. The sparger 130 is perforated therealong so as to allow flow of gas from the interior to the exterior thereof. Also located along the conduit 129 are a flow meter 132, a flow control valve 133 for controlling flow of air through the conduit 129 and an oxygen meter 134 for determining the percentage of oxygen in the recycle air within the conduit 129.

The tank 83 also has a vent 135 located on the roof 127 thereof to allow venting of air from the tank 83 once a preselected pressure is reached within the chamber 126. The vent 135 may include conventional equipment for removing odors and the like from the air passing through the vent 135.

In operation the system 80 is somewhat similar to the previous embodiment with the following exceptions. In the present embodiment the air draws from two different sources which include the recycle air coming into the tank 83 through the sparger 130 and the fresh air that is drawn into the sludge passing through the eductor 100. Both the fresh air and the recycle air are distributed in the lower portion of the tube 93 and the air bubbles therefrom flow up through the sludge 88 to the upper surface of the sludge 89 and this air is collected in the chamber 126. At least a portion of the air that passes into the chamber 126 is drawn therefrom through the conduit 125 by the blower 128 and recycled back is to the sparger 130.

The sludge is originally pumped into the tank 83 from supply 104 through the conduit 105 until the level of the sludge 88 reaches the high level mark 89. To fill the tank 83 the flow control valve 106 is open and once the tank 83 is full the valve 106 is closed. During operation of the system 80 to destroy pathogens, the valves 108 and 114 are open and the pump 99 is activated to draw sludge from the tank 83 through the pump 99 and through the eductor 100 back to be distributed within the tank 83 and specifically within the tube 93. The sludge which is returned to the tank 83 is distributed through the conduit section 117 to the interior of the tube 93. The flow control valve 120 controls the amount of fresh air drawn into the eductor 100 and the flow control valve 133 controls the Amount of recycle air delivered to the sparger 130 near the bottom of the tank 83.

While the first embodiment of the present invention is controlled manually, the present embodiment is directed to a system 80 which is controlled by a process controller 86. The process controller 86 includes a computer linked to the various elements shown in the drawing and, in particular, to the blower 128; various flow control valves 133, 106, 108, 114, 111, and 120; the pump 99; the level indicator 99; the temperature indicator 91; the oxygen meter 134 and the flow meter 132. During use of the method of the present invention for destroying pathogens within the sludge 88, the process controller 86 closes the valves 106 and 111 and opens the valves 108 and 114, while activating the pump 99 to circulate sludge through the pump 99 and the eductor 100. The process controller 86 also opens the valve 120 to allow a controlled amount of fresh air from the source 119 to enter the eductor 100 and subsequently be drawn with the sludge 88 passing through the eductor 100 into the tank 83. Likewise, the process controller 86 operates the blower 128 in conjunction with the valve 133 to control the flow or alternatively the ratio of recycle air passing into the sparger 130.

The process controller 86 determines the ratio of fresh air to recycle air by determining whether the temperature of the sludge 88, as indicated by the temperature indicator 91, is within a preselected temperature range which is best suited for the thermophilic anaerobic process taking place. For each installation of the system 80 this range may vary and a typical preferred set point would be approximately 65° C., although the range may generally extend from 50° C. to 70° C. For many particular installations a temperature of 50° C. would be too low and, consequently, the operating range for many systems would be more in the 60° C. to 70° C. range. Of importance in determining a preferred temperature range is the relationship between the temperature and the residence time required for destroying the pathogenic organisms.

Illustrated in FIG. 3 is a graph showing the general relationship between operating temperature and the time required for killing pathogenic organisms at each temperature, as determined by government regulatory bodies. For example, at 65° C. it is expected that it would take approximately three hours to kill the various pathogens, whereas at 50° C. it would take in excess of one hundred hours to kill the pathogens.

If it is required that the sludge 88 within the tank 83 be completely treated thermophilicly to destroy all pathogenic organisms within a certain time period, then the temperature must be maintained at or above the temperature related to that specific residence time in order to ensure that the pathogens within the sludge 88 are completely killed and the sludge can be transferred from the tank 83 for subsequent disposal before new sludge must be pumped into the tank 83. The process controller 86 utilizes various parameters such as the percentage of oxygen in the recycle determined by the meter 134 and the flow of recycle air, as determined by the flow meter 132. The result is that the process controller 86 controls the various pieces of equipment to ensure that the sludge 88 within the tank 83 is maintained at the preselected temperature or at least within a preselected range of temperatures.

In the present embodiment, both the fresh and recycle air streams rise in the tube 93 which causes the sludge 88 within the tube 93 to also rise and flow over the top of the tube 93 as is indicated by the arrows into the part of the sludge 88 external to the tube 93. The sludge external to the tube 93 in turn flows downwardly and subsequently inwardly at the bottom of the tube 93 as is again indicated by the arrows. This creates a mixing within the tank 83 of the sludge 88. The transfer of sludge 88 from and return to the tank 83 by the pump 99 also creates a mixing effect within the sludge 88.

It is noted that the amount of fresh air that comes into the system is generally equated to the amount of air that will be released by the vent 135 less the amount of oxygen that is absorbed from the air as it bubbles up through the sludge 88. As an example in a system approximately 10% of the oxygen may be absorbed from the air on each passage through the sludge 88, but this will vary greatly with the maximum depth 89 of the sludge 88 and with certain other characteristics of the system 80 including the quality of the sludge and how many times the air recycles on the average.

Illustrated in FIG. 4 is a chart showing data from a typical plant, such as is illustrated in FIG. 2, and comparing typical temperature for this particular plant to the percentage of fresh air injected into the sludge as compared to the total air injected. The chart indicates that for the particular system illustrated that the temperature of the sludge is approximately 51° C. if only fresh air is used, whereas the temperature of the sludge approaches 65° C. if approximately only 25% fresh air is used and 75% recycle air is used. Since the chart in FIG. 3 suggests that the reaction time required to remove all pathogens at 65° C. is significantly less than that required to remove the pathogens at 51° C., it is easily seen that it is desirable to operate this particular system at fresh air to total air ratio of 25% or less. It is important to not increase the temperature of the sludge to a temperature that is above the maximum temperature at which thermophilic bacteria thrive (about 70° C.), since this could also destroy the beneficial thermophilic microorganisms which are actually creating the exothermic reaction which is causing the temperature rise.

Of particular importance to the system 80 shown in FIG. 2 is that all of the operating equipment which has moveable parts is exterior to the tank 83. This significantly reduces down time and reduces the number of problems associated with such equipment.

When the sludge 88 has been completely treated so that all of the pathogenic organisms are dead, the process controller 86 closes the flow control valve 114 and opens the flow control valve 111, while activating the pump 99. The pump 99 then transfers the sludge 88 from the tank 83 to disposal 104. Sludge disposal may be to trucks that haul away the sludge or to storage equipment as is suitable for the particular installation.

It is noted that in the present invention the height of the tank 83 and the consequent upper level of the sludge 88 can be varied substantially depending upon local requirements. With different levels of sludge, the operating parameters are modified by the process controller 86. It is possible and, in some operating conditions, quite likely that the tank 83 will not be filled entirely to the maximum sludge upper level 88, but rather to some lower level. This will especially be true when the process feeding sludge to the tank 83 produces varying amounts of sludge daily or under whatever time schedule sludge pumping occurs. This is a distinct advantage for the methods and apparati that are disclosed in the present application. It is foreseen that in some instances where wide swings in sludge production are expected that air directing tube such as tube 93 may be eliminated or substantially shortened to allow for significantly smaller volumes of sludge then would fill the tank to the maximum desirable sludge level.

A key advantage of the present system is that it allows selective recirculation of the recycle air to control the temperature of the sludge 88. It is noted that the total volume of air that is injected into the sludge 88 may be held constant, while varying the ratio of recycle air to fresh air, or alternatively it may be possible to fix the amount of fresh air or the amount of recycle air and, therefore, vary the total amount of air to obtain the desired temperature or temperature range.

While the systems of each of the described embodiments are directed to independent operating reactors or tanks, it is possible in some installations that the two or more reactors could be operated in series, parallel or in combinations of order in order to satisfy the requirements of the particular sludge or similar material being treated by the systems.

While the illustrated embodiments discuss use of the invention with sludge, it is foreseen that the process may also be used to control thermophilic waste water treatment process or similar processes.

Furthermore, it is foreseen that in some installations of the invention, it may be beneficial to have both the recycle and the fresh air pass through the eductor with the various air flows controlled by valves. In such an embodiment the blower illustrated in the illustrated embodiments would not be used; but rather, the recycle line would tie into the fresh air line shown in the second embodiment prior to the eductor. In such an embodiment, total gas flow through the eductor is related to total liquid flow pumped through the eductor and fresh air to recycle mix is controlled by valveing on the associated feed conduits.

It is to be understood that while certain forms of the present invention have been illustrated and described herein, it is not to be limited to the specific forms or arrangement of parts described and shown.

What is claimed and desired to be secured by Letters Patent is as follows:

1. A thermophilic and aerobic reactor system comprising:
   a) a reactor tank for receiving a sludge material;
   b) a gas injection mechanism for injecting oxygen containing gas into the material such that the gas passes through the material;
   c) a recirculation apparatus flow connected to an interior of the tank for withdrawing recycle gas from the tank that has passed through the material, the recirculation apparatus being flow connected to the gas injection mechanism so as to transfer at least a portion of the recycle gas through the material;
   d) a fresh air delivery mechanism operably flow connected to the reactor tank;
   e) a temperature controller for controlling the temperature in the material within a preselected thermophilic temperature range including means for varying a mix of fresh air to recycle gas such that increasing the percentage of fresh air in the mix decreases the temperature and decreasing the percentage of fresh air in the mix increases the temperature.

2. The system according to claim 1, further comprising:
a) a pump for withdrawing a portion of the material from the tank and returning the withdrawn portion to the tank.

3. The system according to claim 2, further comprising:
a) an eductor cooperating with the pump to supply fresh air to the material returned to the tank.

4. The system according to claim 1, further comprising:
a) a tube with a vertically extended center opening located in said tank, said tube separating the material in the tank into a first part on one side of the tube and a second part on an opposite side of the tube, said first and second parts of the material being flow connected at both a top and a bottom of the tube, the gas injection mechanism injecting gas in a lower region of the first part of the material and not into the second part such that the first part rises with the air and the second part flows downwardly during injection of air thereby mixing the material.

5. The system according to claim 2, wherein:
a) the pump is located external to the tank and flow connected therewith.

6. The system according to claim 2, wherein:
a) the pump is also selectively flow connectable to a material discharge apparatus such that the pump moves material from the tank to the discharge apparatus when treatment of the material in the tank is complete.

* * * * *